United States Patent
Yoon

(10) Patent No.: US 11,734,400 B2
(45) Date of Patent: Aug. 22, 2023

(54) ELECTRONIC DEVICE AND CONTROL METHOD THEREFOR

(71) Applicant: LG ELECTRONICS INC., Seoul (KR)

(72) Inventor: Heejoo Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 16/760,439

(22) PCT Filed: Nov. 23, 2017

(86) PCT No.: PCT/KR2017/013416
§ 371 (c)(1),
(2) Date: Apr. 29, 2020

(87) PCT Pub. No.: WO2019/088338
PCT Pub. Date: May 9, 2019

(65) Prior Publication Data
US 2020/0356647 A1    Nov. 12, 2020

(30) Foreign Application Priority Data
Oct. 31, 2017  (KR) .................. 10-2017-0143749

(51) Int. Cl.
*G06F 21/32*      (2013.01)
*G06T 7/70*       (2017.01)
(Continued)

(52) U.S. Cl.
CPC ............ *G06F 21/32* (2013.01); *G06T 7/0014* (2013.01); *G06T 7/70* (2017.01); *G06V 40/172* (2022.01);
(Continued)

(58) Field of Classification Search
CPC combination set(s) only.
See application file for complete search history.

(56) References Cited

U.S. PATENT DOCUMENTS

2015/0104037 A1*  4/2015  Lee .................. H04S 7/308
                                                     381/80
2015/0134330 A1*  5/2015  Baldwin ............ H04L 9/3231
                                                     704/232
(Continued)

FOREIGN PATENT DOCUMENTS

JP    2012014394    1/2012
KR    100827080    5/2008
(Continued)

OTHER PUBLICATIONS

PCT International Application No. PCT/KR2017/013416, International Search Report dated Jul. 27, 2018, 2 pages.

*Primary Examiner* — Phung-Hoang J Nguyen
(74) *Attorney, Agent, or Firm* — Lee Hong Degerman Kang & Waimey

(57) ABSTRACT

The present invention includes: a voice sensor for detecting voice information; a camera for capturing an image of a subject related to the voice information; and a control unit for controlling the camera such that the image of the subject related to the voice information is captured when the voice sensor detects the voice information, and determining, by using the captured image of the subject and the voice information, whether the subject related to the voice information is a counterfeit face, thereby determining whether to execute a control command corresponding to the voice information.

11 Claims, 9 Drawing Sheets

(51) Int. Cl.
  *G06T 7/00* (2017.01)
  *G10L 17/02* (2013.01)
  *G10L 25/78* (2013.01)
  *G06V 40/16* (2022.01)
  *H04N 23/60* (2023.01)

(52) U.S. Cl.
  CPC .............. *G10L 17/02* (2013.01); *G10L 25/78* (2013.01); *H04N 23/60* (2023.01); *G06T 2207/30201* (2013.01)

(56) References Cited

U.S. PATENT DOCUMENTS

| | | | |
|---|---|---|---|
| 2015/0213391 A1* | 7/2015 | Hasan | G06V 20/52 705/7.42 |
| 2018/0098029 A1* | 4/2018 | Cassini | H04N 5/23216 |
| 2019/0190908 A1* | 6/2019 | Shen | H04L 63/0861 |
| 2019/0313055 A1* | 10/2019 | Miki | G01B 11/25 |

FOREIGN PATENT DOCUMENTS

| | | | |
|---|---|---|---|
| KR | 10-1270351 B1 * | 5/2013 | ............... G06K 9/20 |
| KR | 101270351 | 5/2013 | |
| KR | 20150103264 | 9/2015 | |
| KR | 20170000128 | 1/2017 | |

\* cited by examiner

ELECTRONIC DEVICE AND CONTROL METHOD THEREFOR

CROSS-REFERENCE TO RELATED APPLICATIONS

This application is the National Stage filing under 35 U.S.C. 371 of International Application No. PCT/KR2017/013416, filed on Nov. 23, 2017, which claims the benefit of earlier filing date and right of priority to Korean Application No. 10-2017-0143749, filed on Oct. 31, 2017, the contents of which are all hereby incorporated by reference herein in their entirety.

TECHNICAL FIELD

The present invention relates to an electronic device configured to determine voice forgery.

BACKGROUND ART

Recently, with a development of hardware, artificial intelligence technology that realizes a human thinking process, that is, cognition, reasoning, learning, etc., as a computing technology has been rapidly developing.

Artificial intelligence technology is not only a research subject in itself, but can also be combined with other fields of computer science, directly or indirectly, to provide a variety of functions. In particular, attempts have been made to actively utilize artificial intelligence elements in various fields of information technology to solve problems in those fields.

Artificial intelligence technology is divided into strong artificial intelligence and weak artificial intelligence. Strong artificial intelligence is a technology that can make human-like thinking and decision-making. It is a technology that learns by itself and makes judgment on its own. Weak artificial intelligence is a technology that provides optimal solutions by performing cognitive processes such as perception and reasoning through a computational model.

The field of artificial intelligence can be classified into five core technologies: learning and reasoning technology, situational understanding technology, language understanding technology, visual understanding technology, and recognition and cognitive technology. Recently, artificial intelligence speakers with voice recognition function corresponding to language understanding technology have been released.

Meanwhile, in recent years, artificial intelligence speakers have a problem in which a wrong operation is performed by erroneously recognizing a sound output from a radio or TV rather than a user's voice as a voice command. In addition, serious problems have been found in security for personal devices, such as an operation of an artificial intelligence speaker with voice commands from a user who is not authorized.

DETAILED DESCRIPTION OF THE DISCLOSURE

Technical Problem

In order to solve the above-described problem, an aspect of the present invention is to provide an electronic device that determines whether a voice is forged by using audio information and image information together.

In addition, another aspect of the present invention is to improve an accuracy of voice recognition using image information.

Technical Solution

An electronic device according to the present invention includes: a voice sensor configured to detect voice information; a camera configured to capture an image of a subject related to the voice information; and a controller configured to: when the voice information is detected by the voice sensor, control the camera to capture the image of the subject related to the voice information, and determine, by using the captured image of the subject and the voice information, whether the subject related to the voice information is a counterfeit face, thereby determining whether to execute a control command corresponding to the voice information.

In one embodiment, the controller is further configured to calculate distance information of the subject related to the voice information based on the voice information, and control the camera to capture the image of the subject by using the calculated distance information of the subject.

In one embodiment, the controller is further configured, when the subject is the counterfeit face as a result of the determination, not to perform control corresponding to the voice information.

In one embodiment, the electronic device further includes a memory configured to store surrounding environment information of the electronic device, wherein the controller is further configured to capture a surrounding image of the electronic device through the camera, extract an object in which voice information can be outputted from the captured surrounding image, and store location information and type information of the extracted object in the memory.

In one embodiment, the controller is further configured to calculate location information of the subject based on the voice information, and when there is location information that matches the calculated location information among the location information of the object stored in the memory, determine the subject as the counterfeit face.

In one embodiment, the controller is further configured to, when the subject is not the counterfeit face as a result of the determination, compare pre-stored face information with the captured image of the subject based on a face recognition algorithm, and when the image of the subject corresponds to the pre-stored face information as a result of the comparison, determine the subject as a registered user and execute the control command corresponding to the voice information.

In one embodiment, the controller is further configured to calculate a distance between the subject and the electronic device based on the voice information, change a size of the image of the captured subject by using the calculated distance information and size information of a pre-stored face, and compare the pre-stored face information with the image that the size thereof is changed.

In one embodiment, the controller is further configured to, when the image of the subject corresponds to pre-stored face information, determine whether the control command corresponding to the voice information corresponds to a permission associated with the pre-stored face information, and when the control command corresponds to the permission associated with the pre-stored face information as a result of the determination, execute the control command corresponding to the voice information.

In one embodiment, the controller is further configured to, when the image of the subject corresponds to pre-stored face information, compare the voice information associated with the pre-stored face information with voice information received from the voice sensor, and when the voice information associated with the pre-stored face information corresponds to the voice information received from the voice sensor, execute the control command corresponding to the voice information.

In one embodiment, the controller is further configured to, when storing face information of the registered user, store together with height information of the registered user in a memory by linking the height information to the face information.

In one embodiment, the controller is further configured to calculate the height information of the subject based on the voice information detected by the voice sensor, compare the calculated height information with the height information stored in the memory, and verify whether the subject is the registered user.

In one embodiment, the controller is further configured to, when registering face information of the subject, store together with capturing time information of the face information, and determine whether the subject is the registered user by comparing the captured image of the subject with the face information corresponding to the capturing time of the subject.

In one embodiment, the controller is further configured to extract feature information from the image of the captured subject, and perform an update of a pre-stored face image.

In a method for controlling an electronic device according to another embodiment of the present invention, the method includes: detecting voice information through a voice sensor; when the voice information is detected by the voice sensor, capturing an image of a subject related to the voice information through a camera; determining whether the subject related to the voice information is a counterfeit face by using the image of the captured subject and the voice information; and when the subject is not the counterfeit face as a result of the determination, determining whether the subject is a registered user based on the image of the captured subject and a pre-stored face information; and executing a control command corresponding to the voice information when the subject is the registered user, wherein determining whether the subject is a counterfeit face comprises: calculating location information of the subject by using the voice information, and determining whether the subject is the counterfeit face based on the calculated location information and the image of the subject.

In one embodiment, wherein determining whether the subject is the counterfeit face is further comprises: comparing location information of an object stored in an object database with the calculated location information, and when there is location information of the object corresponding to the calculated location information as a result of the comparison, determining the subject as the counterfeit face.

Advantageous Effects

According to the present invention, when voice information is detected, an image of a subject related to the voice information is captured, and whether the face of the subject is a counterfeit face is determined using the captured image information, and execute a control command corresponding to the voice information according to the determination result. By executing the control command, use by a device that forged or falsified the voice or use by an unauthorized user can be restricted. Therefore, the present invention may enhance security of electronic devices.

In addition, according to the present invention, when voice information is detected, an image of a subject related to the voice information is captured, and the captured image information is compared with pre-stored voice information to determine whether the voice information corresponds to a registered user's voice, and determine execution of a control corresponding the voice information. In this manner, only a user who is permitted to use the electronic device can control the electronic device, thereby enhancing the security of the electronic device.

Further, according to the present invention, a distance between an electronic device and a subject that utters voice information is calculated based on voice information, and when face information of the subject is recognized using the distance between the electronic device and the subject, a size of an image of the subject is re-sized to perform face recognition, thereby enhancing face recognition speed without lowering a recognition rate of the face recognition.

MODES FOR CARRYING OUT PREFERRED EMBODIMENTS

Figure 1:
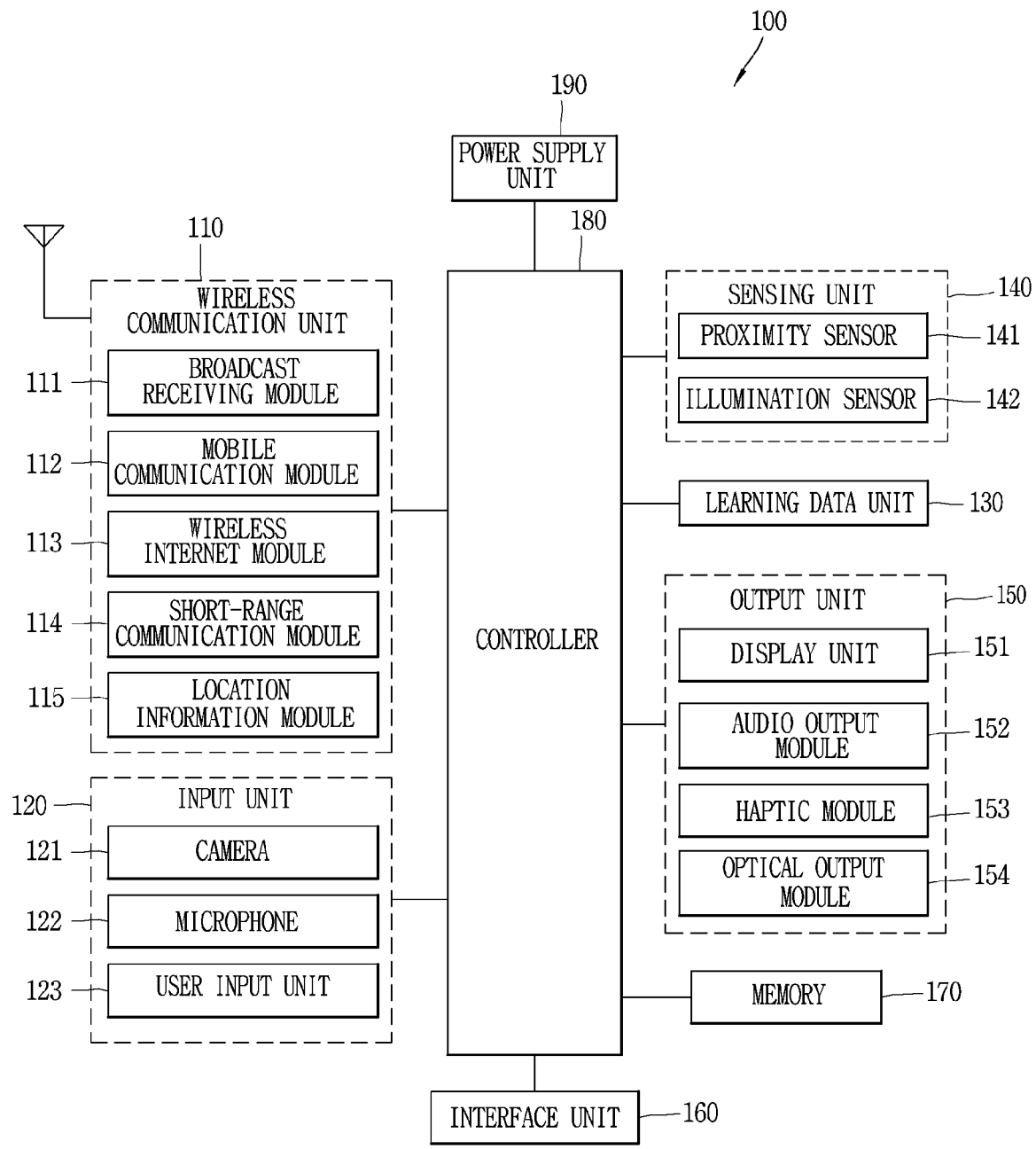
FIG. 1 is a block diagram to explain an electronic device according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present invention, if a detailed explanation for a related known function or construction is considered to unnecessarily divert the gist of the present invention, such explanation has been omitted but would be understood by those skilled in the art. The accompanying drawings are used to help easily understand the technical idea of the present invention and it should be understood that the idea of the present invention is not limited by the accompanying drawings. The idea of the present invention should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 1A to 1C, FIG. 1A is a block diagram of a mobile terminal in accordance with the present invention, and FIGS. 1B and 1C are conceptual views illustrating one example of a mobile terminal, viewed from different directions.

The mobile terminal 100 may include a wireless communication unit 110, an input unit 120, a sensing unit 140, an output unit 150, an interface unit 160, a memory 170, a controller 180, a power supply unit 190, etc. It is understood that implementing all of the components illustrated in FIG. 1A is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiver 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors, and combinations thereof.

The output unit 150 may typically be configured to output various types of information, such as audio, video, tactile output, and the like. The output unit 150 may include at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is implemented to store data to support various functions or features of the mobile terminal 100. For instance, the memory 170 may be configured to store application programs or applications executed in the mobile terminal 100, data or instructions for operations of the mobile terminal 100, and the like. At least one of these application programs may be downloaded from an external server via wireless communication. Other application programs may be installed within the mobile terminal 100 at time of manufacturing or shipping, which is the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiver 111 is configured to receive a broadcast signal and/or broadcast associated information from an external broadcast managing server via a broadcast channel. The broadcast channel may include a satellite channel, a terrestrial channel, or both. In some embodiments, two or more broadcast receivers may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The radio signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display 151 or stored in the memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear side or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

A learning data unit 130 may be configured to receive, classify, store, and output information to be used for data mining, data analysis, intelligent decision making, and machine learning algorithms and technologies. The learning data unit 130 may include one or more memory units configured to store information which is received, detected, sensed, generated, pre-defined through a terminal, or to store data which are received, detected, sensed, generated, pre-defined by another configuration, device and terminal.

The learning data unit 130 may be integrated into a mobile terminal or include a memory provided therein. In one embodiment, the learning data unit 130 may be implemented through the memory 170. However, the present invention is not limited thereto, and the learning data unit 130 may be implemented in a memory associated with the mobile terminal 100 (e.g., an external memory connected (by wire or electrically connected) to the mobile terminal 100), or may be implemented through a memory included in a server capable of communicating with the mobile terminal 100. In another embodiment, the learning data unit 130 may be implemented by a memory maintained in a cloud computing environment or another remote memory accessible by a terminal through a communication method such as a network.

To identify, index, classify, manipulate, store, search and output data for use in supervised or unsupervised learning, data mining, predictive analytics, or other machine learning techniques, the learning data unit 130 is generally configured to store the data in more than one data base. Information stored in the learning data unit 130 may be used by a controller 180 using at least one among different types of data analysis, machine learning algorithm, and machine learning technology, or by a plurality of controllers included in the mobile terminal. Examples of such algorithms and techniques are k-Nearest neighbor system, fuzzy logic (e.g., possibility theory), neural networks, Boltzmann machines, vector quantization, pulsed neural nets, support vector machines, maximum margin classifiers, hill-climbing, inductive logic systems, baysian networks, petri nets (e.g., finite state machines, mealy machines, and moore finite state machines), classifier trees (e.g., perceptron trees, support vector trees, markov trees, decision tree forests, and random forests), pandemonium models and systems, clustering, artificially intelligent planning, artificially intelligent forecasting, data fusion, sensor fusion, image fusion, reinforcement learning, augmented reality, pattern recognition, automated planning, etc.

The controller 180 may determine or predict at least one executable operation of the mobile terminal based on information determined or generated by data analysis, machine learning algorithms, and machine learning techniques. To this end, the controller 180 may request, search, receive, or utilize data of the learning data unit 130. The controller 180 may perform various functions implementing a knowledge-based system, an inference system, and a knowledge acquisition system, and may perform various functions including a system for uncertain reasoning (e.g., a fuzzy logic system), an adaptive system, a machine learning system, an artificial neural network, etc.

The controller 180 may include sub-modules that enable processing of voice and natural language such as an I/O processing module, an environmental condition module, a voice-text (STT) processing module, a natural language processing module, a work flow processing module, and a service processing module, etc. Each of the sub-modules may have access to one or more systems or data and models in the mobile terminal, or a subset or superset thereof. Here, targets to which each sub-module has access may include scheduling, vocabulary index, user data, task flow model, service model, and automatic speech recognition (ASR) system. In another embodiment, the controller 180 or the mobile terminal may be implemented as the sub-module, system, or data and model.

In some embodiments, based on data in the learning data unit 130, the controller 180 may be configured to detect and sense a request of a user based on user's intention or context condition expressed in user input or natural language input. In addition, the controller 180 may actively derive or acquire information needed in completely determining user's request according to context condition or user's intention. For example, the controller 180 may detect and sense user's request by analyzing past data including past input and output, pattern matching, unambiguous words, input intention, etc. In addition, the controller 180 may determine a work flow for executing a function requested by the user according to context condition or user's intention. In addition, the controller 180 may execute a workflow for satisfying user's request based on context condition or user's intention.

In some embodiments, the controller 180 may implement hardware components dedicated to a learning data process including memistor, memristors, mutual conductance amplifiers, pulsed neural circuits, artificial intelligence nanotechnology systems (e.g., autonomous nanomachines), or artificial intelligence quantum mechanical systems (e.g., quantum neural network). In some embodiments, the controller 180 may include a pattern recognition system such as a machine vision system, an acoustic recognition system, a handwriting recognition system, a data fusion system, a sensor fusion system, and a soft sensor. The machine vision system may include content-based image search, optical character recognition, augmented reality, egomotion, tracking, and optical flow.

The controller 180 may detect or receive information in the mobile terminal, surrounding environment information of the mobile terminal, or other information through the sensing unit 140. Also, the controller 180 may receive a broadcast signal and/or broadcast-related information, a wireless signal, wireless data, etc. through the wireless communication unit 110. Also, the controller 180 may receive image information (or a corresponding signal), audio information (or a corresponding signal), data, or information input by a user from the input unit.

The controller 180 may collect information, process or classify the information (e.g., a knowledge graph, a command policy, a personalization database, a conversation engine, etc.), and store the processed or classified information in the memory 170 or the learning data unit 130.

In addition, when an operation of the mobile terminal is determined based on data analysis, machine learning algorithm and machine learning technology, controller 180 may control the components of the mobile terminal to execute the determined operation. The controller 180 may execute the determined operation by controlling the mobile terminal based on a control command.

In one embodiment, when a specific operation is performed, the controller 180 may analyze history information indicating performance of the specific operation through data analysis, machine learning algorithm, and machine learning technology, and may update existing learned information based on the analyzed information. Accordingly, the controller 180 may improve an accuracy of future performance of data analyses, machine learning algorithms, and machine learning technologies based on the updated information, together with the learning data unit 130.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object existing near a surface, by using an electromagnetic field, infrared light, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor may sense a touch (or a touch input) applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a protrusion scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, in an electronic device including at least one of the components described in FIG. 1, a method for controlling an operation of the electronic device by using voice information and image information will be described.

Electronic devices released recently are equipped with voice recognition function, so that various functions can be executed using a user's voice command. However, the electronic devices do not distinguish a sound output from a TV or radio from a sound uttered by a person, thereby resulting in a malfunction. In addition, in recent years, as a forgery and alteration technology of voice has been developed, a voice uttered by someone other than a real user is misrecognized as a voice of the real user, thereby revealing a vulnerability of security.

Figure 2:
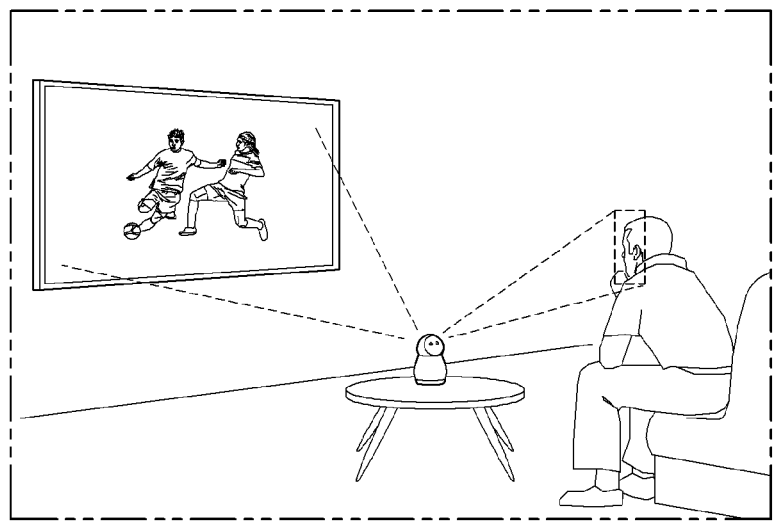
FIG. 2 is a conceptual view illustrating an example of use of an electronic device according to the present invention.
Figure 3:
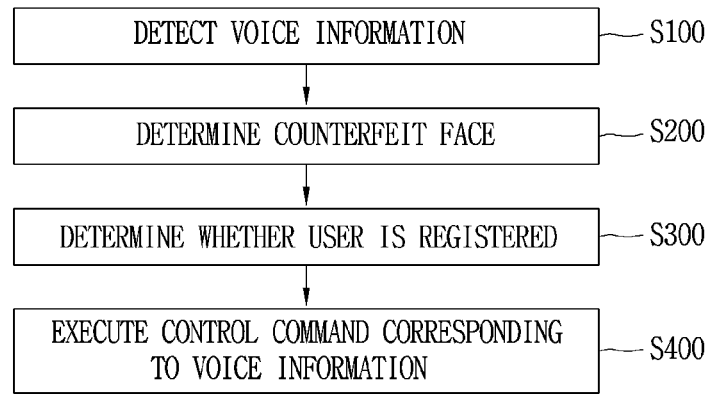
FIG. 3 is a flowchart illustrating an operation flow of an electronic device related to the present invention.

Hereinafter, a method for solving those problems by using a multi-sensor will be described. FIG. 2 is a conceptual view illustrating an example of use of an electronic device according to the present invention, and FIG. 3 is a flowchart illustrating an operation flow of an electronic device related to the present invention.

The electronic device related to the present invention may include a voice sensor, a camera, and a controller.

The voice sensor is a sensor configured to receive voice information. The sensor may include an ultrasonic sensor, a microphone 122, and the like. The ultrasonic sensor may be configured to detect an audio signal in an ultrasonic range, and the microphone 122 may be configured to detect an audio signal in an audible frequency range. Meanwhile, the ultrasonic sensor and the microphone 122 may be provided separately, or may be provided as a single module.

The voice sensor may convert detected voice information into an electrical signal that can be recognized by an electronic device.

The camera 121 is configured to capture an image of a subject, and may include an image sensor. The subject may include an object and/or a person outputting or uttering a voice.

The controller 180 may control an operation of the electronic device by using voice information detected by the voice sensor and image information captured by the camera 121.

The electronic device may further include the components described in FIG. 1, and detailed description is replaced with the description of FIG. 1.

Referring to FIG. 2, an electronic device 100 may be located at a specific place inside a house to receive voice information from outside or capture an outside image.

The electronic device 100 related to the present invention illustrated in FIG. 2 may execute a voice recognition application installed in advance when the electronic device is released from a factory, or a voice recognition application to be developed by a third party supplier (3rd party app) in an application market.

The voice recognition function may be executed in any one mode between an idle mode detecting whether a starting word is uttered and the voice recognition mode analyzing voice information and performing an operation according to a result of the analysis. The idle mode is to detect whether a predetermined starting word is uttered to start the voice recognition mode, and may be operated with low power. The starting word is preset for each electronic device, and is a voice command to execute the voice recognition mode in an idle mode. For example, the starting word can be 'aria', 'okay, google', etc., which can be changed by a user.

When a starting word is detected, the electronic device 100 may start the voice recognition mode. The voice recognition mode is a mode to analyze voice information received through the voice sensor and operate the electronic device according to a result of the analysis.

Hereinafter, a description will be given of a control method for detecting voice information while the voice recognition function is executed.

An operation flow of the electronic device will be described with reference to FIG. 3.

Referring to FIG. 3, firstly, the controller 180 of the electronic device 100 related to the present invention may detect voice information through the voice sensor (S100). For example, the controller 180 may detect a voice uttered by a user through the voice sensor, and convert the detected voice into voice information recognizable by the electronic device.

When voice information is detected, the controller 180 may determine whether the subject related to the voice information is a counterfeit face (S200).

When voice information is detected, the controller 180 may capture an image of a subject related to the voice information through the camera 121. Then, the controller 180 may determine whether the subject is a counterfeit face based on the captured image. Here, the counterfeit face includes a face on a photo, a face in a video, and a face mockup which is not a face of a real person such as a face mask or an electronic device such as a radio or a smart phone that outputs voice information.

The controller 180 may determine whether the face is a fake by using the existing various face recognition techniques. For example, the controller 180 may learn feature points of the face and determine whether the face is a fake based on a result the learning. The feature points of the face may include a face area of interest, eyes, nose, mouth, etc.

Meanwhile, the controller 180 may calculate location information and distance information of a subject that utters voice information based on the voice information. The distance information of the subject indicates a distance between the electronic device and the subject. In this case, the controller 180 may control the camera 121 to capture the subject based on the location information of the subject. For example, the controller 180 may rotate the camera 121 so that a capturing direction of the camera 121 faces the subject.

The controller 180 may not execute a control command corresponding to voice information when it is determined that the subject is a counterfeit face based on the face recognition technology. On the other hand, when it is determined that the subject is not a counterfeit face based on the face recognition technology, the controller 180 may determine whether the subject corresponds to a registered user (S300).

The registered user is a user authorized to use the electronic device. User information of the user may be previously stored in the memory 170 of the electronic device 100. The user information may be face information representing facial features such as eyes, nose, mouth, wrinkles, and a shape of head.

The controller 180 may determine whether face information extracted from the image of the subject captured through the camera 121 corresponds to pre-stored face information based on the face recognition algorithm. When the face information extracted from the image of the subject does not match the pre-stored face information, the controller 180 may determine that the subject related to the voice information is not a registered user. In this case, the controller 180 may not execute a control command corresponding to the voice information.

When the face information extracted from the image of the subject matches the pre-stored face information, the controller 180 may determine that the subject related to the voice information is a registered user. In this case, the controller 180 may execute a control command corresponding to the voice information (S400). For example, when a subject related to the voice information is a registered user and a control command corresponding to the voice information is 'play the latest song', the controller 180 can play the latest song.

Meanwhile, although not illustrated, the electronic device may set different permissions for each of several registered users. The permissions may indicate a range in which a plurality of functions installed in the electronic device can be executed. For example, permissions may be set such that a user A can execute only first to third functions among first to tenth functions installed in the electronic device, and a user B can execute only fourth to sixth functions among the first to tenth functions. Permissions can be set by the user.

The controller 180 may determine whether to execute a control command corresponding to voice information according to a permission of a registered user, even if a subject related to the voice information is the registered user. For example, when a permission for a registered user is set for only first and second functions, and a control command corresponding to voice information is an execution command of third function, the controller 180 may not execute the control command corresponding to the voice information even if the user is the registered user. Therefore, the present invention may enhance the security of the electronic device by allowing the registered user to use the electronic device within the set permissions.

In addition, although not illustrated, when it is determined that a subject is a pre-stored user, the electronic device can update pre-stored face information by using a captured image the subject. Accordingly, the electronic device according to the present invention can collect the latest face information of the user, thereby improving an accuracy of face recognition.

The foregoing description has been given of the operation flow of the electronic device 100 related to the present invention.

Figure 4:
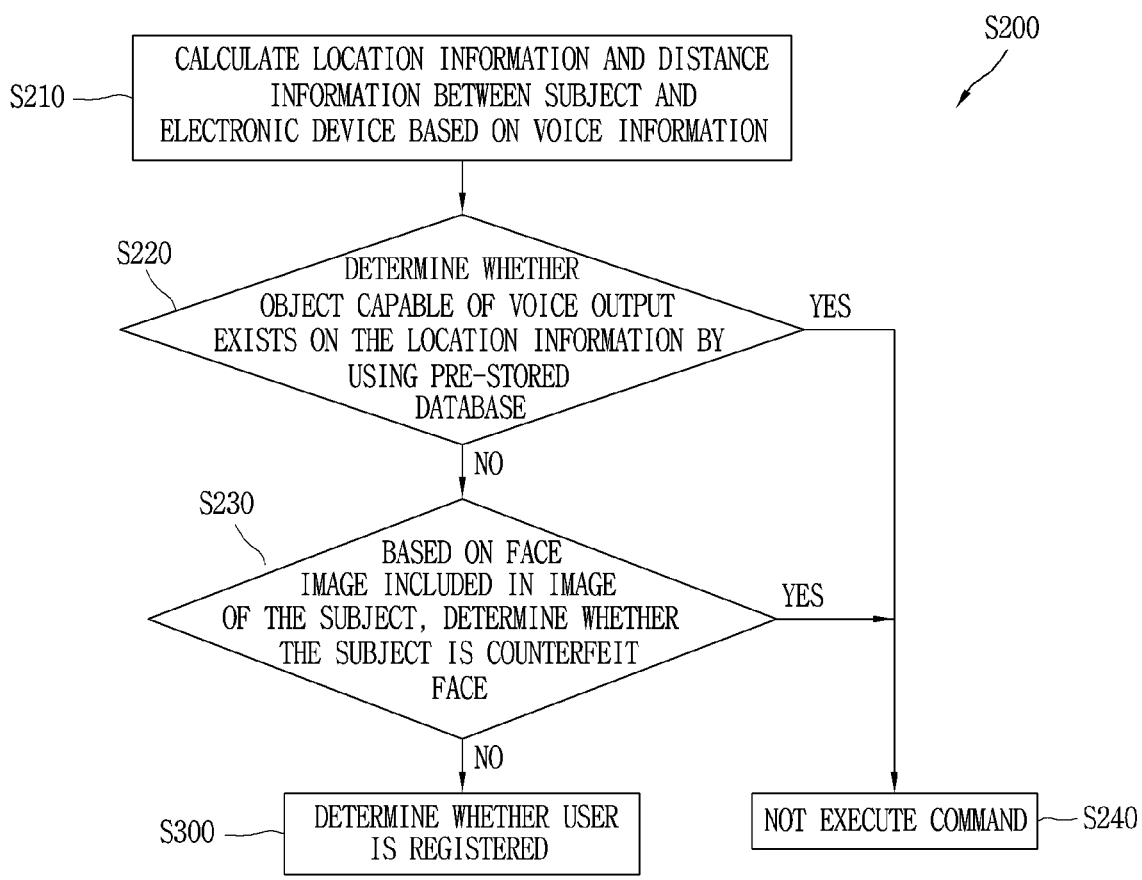
FIG. 4 is a flowchart illustrating a method for determining a counterfeit face in an electronic device related to the present invention.

Hereinafter, a method for determining a counterfeit face by using the voice sensor and the camera in the electronic device 100 related to the present invention will be described in more detail. FIG. 4 is a flowchart illustrating a method for determining a counterfeit face in an electronic device related to the present invention.

Referring to FIG. 4, when voice information is detected by the voice sensor, the controller 180 may calculate location information and distance information between the electronic device and a subject related to the voice information, based on the voice information (S210).

The controller 180, with respect to a direction in which the voice information is received, may calculate location information of the subject related to the voice information based on the electronic device. For example, the controller 180 may calculate that the electronic device related to the voice information is located in the southeast of the electronic device, based on the reception direction of the voice information.

In addition, when voice information is received, the controller 180 may output a preset audio signal for measuring location and distance toward the subject related to the voice information. The preset audio signal may be an ultrasonic signal. Thereafter, the voice sensor may receive a reflected wave signal reflected from the subject, and calculate location information and distance information between the subject and the electronic device 100.

When location information and distance information of the subject are calculated, the controller 180 may determine whether an object capable of voice output exists on the location information by using a pre-stored database (S220).

The electronic device 100 related to the present invention may further include an object database to store location information of objects around the electronic device. For example, the electronic device 100 may capture an image around the electronic device and extract objects included in the captured image. Then, the electronic device 100 may determine types of the objects, and extract objects capable of voice output among the objects. The object capable of voice output may include an electronic device having a voice output unit such as a TV, speaker, radio, and computer.

In addition, the controller 180 may store objects capable of voice output on the object database and location information of each object. Before determining whether a subject related to voice information is a counterfeit face, the controller 180 may firstly compare location information of an object capable of voice output on the object database with location information of a subject related to the voice information. In addition, when the location information of the subject related to the voice information corresponds to the location information of the object capable of voice output stored in the object database, the controller 180 may determine that the subject related to the voice information is a counterfeit face. For example, when the location information of the subject related to the voice information corresponds to the location information of a TV on the object database, the controller 180 may determine that the subject is a counterfeit face as the subject is a TV.

In addition, on the object database, objects including a face image or a display capable of outputting a face image may also be stored.

That is, the controller 180 may determine a counterfeit face even if the image of the subject is not analyzed according to the face recognition algorithm. Accordingly, the electronic device 100 related to the present invention may prevent unnecessary waste of resources and perform determination of a counterfeit face much quickly as the face recognition algorithm is not executed.

On the other hand, when the location information of the subject does not match the location information of the object capable of voice output stored on the object database, the controller 180 may determine whether the subject is a counterfeit face or not based on the face image included in the image of the subject (S230). The controller 180 may extract feature points of the face from the face image included in the image of the subject. Then, the controller 180 may determine whether the subject is a counterfeit face by using the feature points of the face. The feature points of the face may include feature points of eyes, nose, and mouth.

The foregoing description has been given of a method for determining whether a subject related to voice information is a counterfeit face in the electronic device related to the present invention. The present invention may speed up a determination of a counterfeit face by using location information of previously stored objects.

Figure 5:
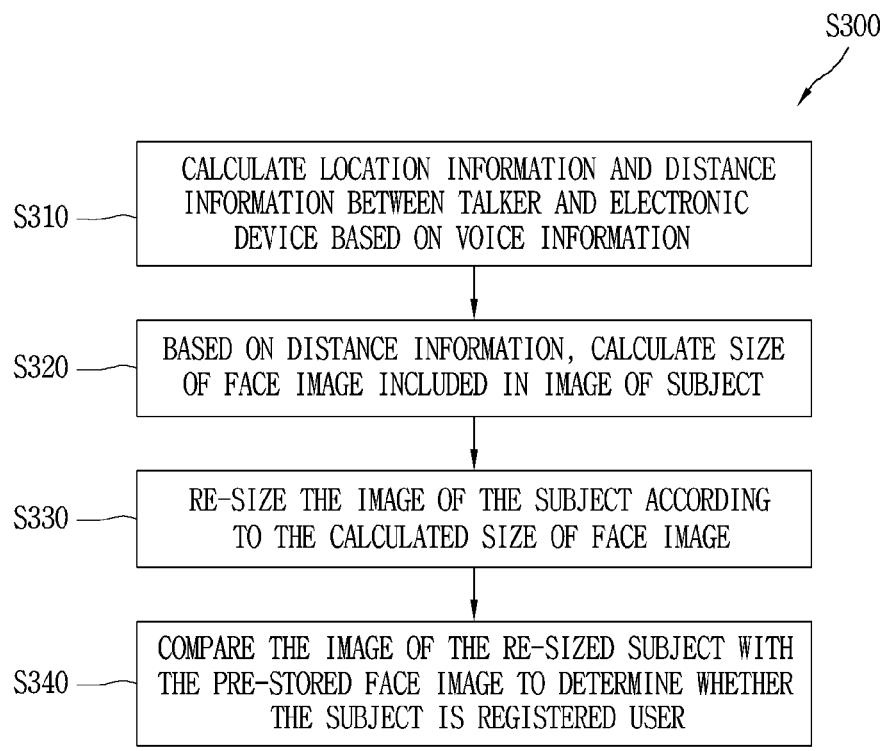
FIG. 5 is a flowchart illustrating a method for determining whether a subject related to voice information is a registered user in an electronic device related to the present invention.
Figure 6A:
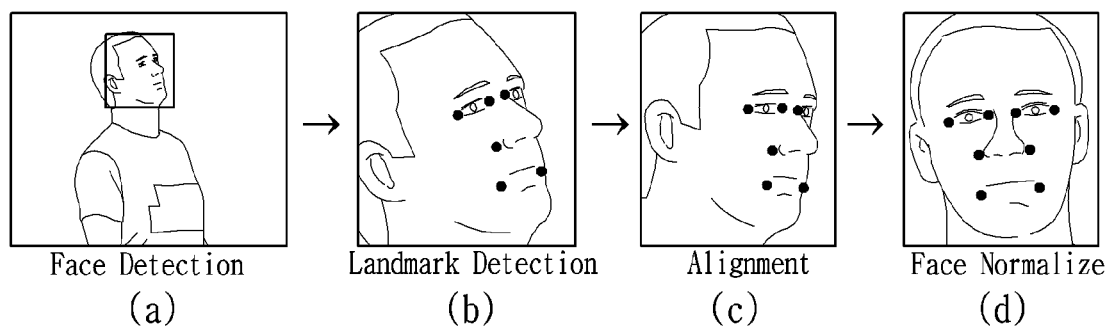
FIGS. 6A to 7 are views illustrating an example of a face recognition technology.
Figure 6B:
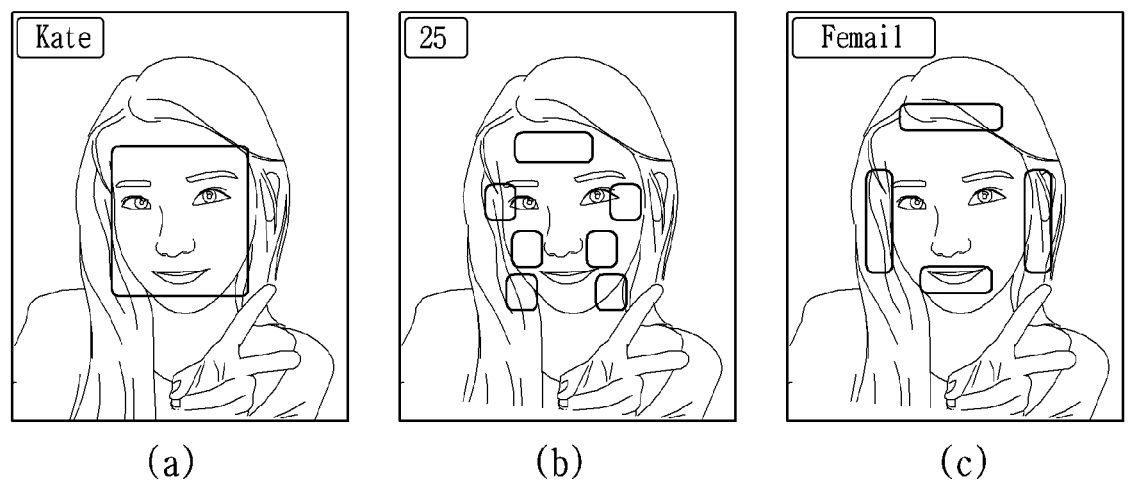
Figure 7:
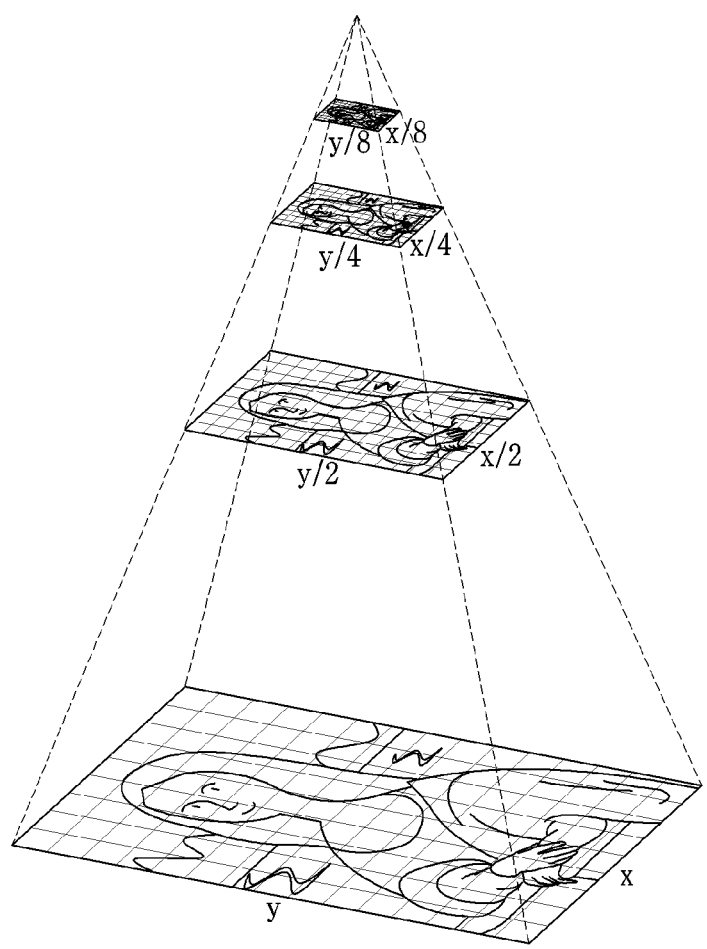

Hereinafter, a method for determining whether a subject related to voice information is a registered user in the electronic device related to the present invention will be described. FIG. 5 is a flowchart illustrating a method for determining whether a subject related to voice information is a registered user in an electronic device related to the present invention. FIGS. 6A to 7 are views illustrating an example of a face recognition technology.

The controller 180 may determine whether a subject is a registered user by using face recognition technology. Hereinafter, the facial recognition technology will be described in more detail with reference to FIGS. 6A and 6B.

Referring to (a) of FIG. 6A, the controller 180 may firstly detect a face image from an image of a subject in order to perform face recognition. Then, as illustrated in (b) of FIG. 6A, the controller 180 may extract at least one feature point from the face image. The feature points are points representing features of the face such as eyes, nose, mouth, eyebrows, ears, and head. A step of extracting the feature points may also be referred to as landmark detection. As illustrated in (c) of FIG. 6A, the controller 180 may rearrange the face image so that the eyes, nose, and mouth included in the face are on a straight line after extracting the feature points. Thereafter, as illustrated in (d) of FIG. 6A, the controller 180 may normalize the face image such that the rearranged face image is to be a front face.

Then, the controller 180 may extract different feature points from the face image according to a result to be extracted through face recognition. Referring to FIG. 6B, the controller 180 may extract a face region in order to identify a user through face recognition. Alternatively, the controller 180 may extract information on an area around the eyes, an area around the nose, both ends of the lips, and wrinkles of the neck in order to extract users age through face recognition. Or, the controller 180 may extract information on head, forehead, and lips to identify user's gender through face recognition.

On the other hand, when executing a face recognition function using the face recognition technology, the controller 180 may perform face recognition by comparing an image for face recognition with previously stored face information while changing the image into various sizes, as illustrated in FIG. 7. That is, since the controller 180 cannot determine a size of a face image on an image that is a target of face recognition, a result of face recognition can be obtained by changing the image into several sizes and comparing the changed image with a face image of a pre-stored size.

Meanwhile, the electronic device related to the present invention may obtain distance information between the subject and the electronic device through the voice sensor. Hereinafter, a process of performing face recognition using the distance information will be described in more detail.

Referring to FIG. 5, in order to perform face recognition by using the face recognition technology, the controller 180 may calculate location information and distance information between the electronic device and a subject related to the voice information, based on the voice information (S310). In this specification, for convenience of drawings, steps S210 and S310 are illustrated separately, but the step S310 is the same as the step S210, and when determining a counterfeit face, step S300 may be performed using the calculated location information and distance information. Accordingly, a description of the step S310 is replaced with the description of the step S210.

Thereafter, the controller 180 may calculate a size of the face image included in the image of the subject based on the distance information (S320).

The controller 180 may calculate a size occupied by the face image in the image of the subject by using the distance information between the subject and the electronic device and pre-stored registered user's face size information. For example, when a pre-stored user's face size is 50 cm*50 cm based on when a distance between the subject and the electronic device is 2 m and the distance between the user and the electronic device is 1 m, the controller 180 may calculate a size of the face in the image of the subject as 25 cm*25 cm.

The controller 180 may re-size the image of the subject according to the calculated size of the face image (S330).

The face image previously stored for face recognition may be stored with a specific size in the memory 170. For example, a pre-stored face image may be stored with a size of 10 cm*10 cm.

The controller 180 may re-size the image of the subject for face recognition. At this time, the controller 180 may change the size of the subject image so that the size of the face image included on the image of the subject corresponds to the size of the pre-stored face image, based on the calculated face image size. For example, when the size of the subject image is 1 m*1 m and the size of the calculated face image is 20 cm*20 cm, the controller 180 may reduce the size of the subject image into 0.5 m*0.5 m so that the size of the face image included in the subject matches the size of the pre-stored face image.

Thereafter, the controller 180 may compare the image of the re-sized subject with the pre-stored face image to determine whether the subject is a registered user (S340). When the image of the re-sized subject matches the pre-stored face image, the controller 180 may determine the subject as a registered user. Otherwise, the controller 180 may determine that the subject is an unregistered user. That is, unlike the related art face recognition algorithm, the controller 180 may prevent resources from being unnecessarily consumed for face recognition by re-sizing the image in advance. Further, face recognition speed may be enhanced while maintaining the accuracy of face recognition.

On the other hand, although not illustrated, the controller 180 may extract a region of an object from the image of the subject by using location information of the object stored in the object database. For example, the controller 180 may determine whether a specific object is included in the image of the subject captured through the camera, based on a direction captured by the camera and location information of the object. Thereafter, the controller 180 may determine an area in which the specific object is included in the image of the subject as an area in which face recognition is not required, and may exclude the area in which the specific object is included when performing face recognition. In this way, the present invention may enhance face recognition speed by limiting an area in which face recognition is to be performed.

The foregoing description has been given of the method for determining whether a subject is a registered user.

Figure 8:
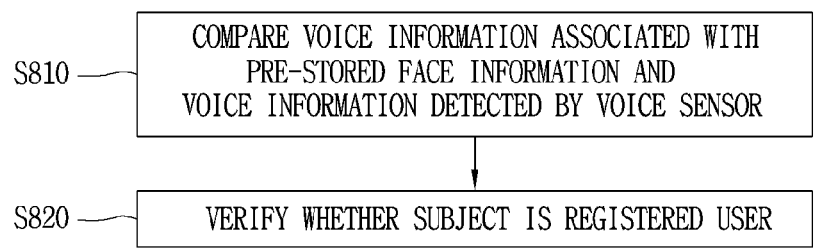
FIG. 8 is a flowchart illustrating a method for improving an accuracy of face recognition by using image information and voice information.
Figure 9:
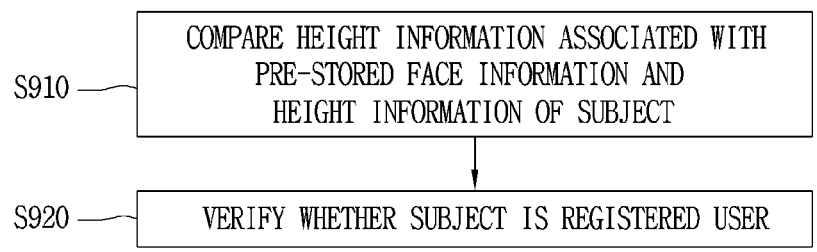
FIG. 9 is a flowchart illustrating a method for improving an accuracy of face recognition by using additional user information.
Figure 10:
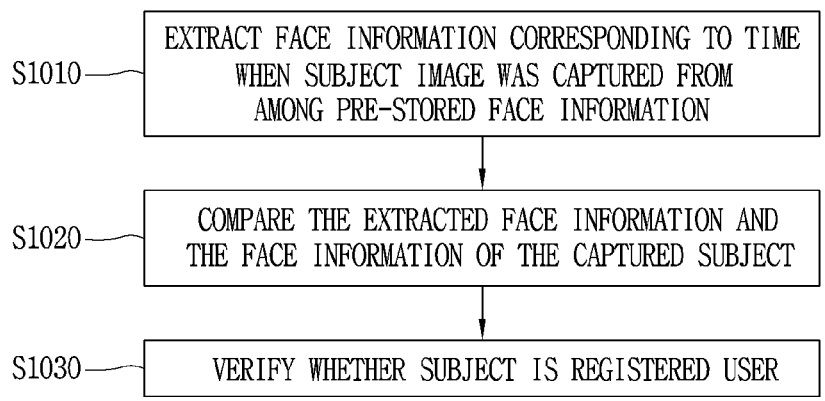
FIG. 10 is a flowchart illustrating a method for improving an accuracy of face recognition by using face information for each time zone.

Hereinafter, a method for enhancing accuracy of face recognition will be described. FIG. 8 is a flowchart illustrating a method for improving an accuracy of face recognition by using image information and voice information. FIG. 9 is a flowchart illustrating a method for improving an accuracy of face recognition by using additional user information. FIG. 10 is a flowchart illustrating a method for improving an accuracy of face recognition by using face information for each time zone.

The controller 180 of the electronic device according to the present invention may determine whether a subject is a registered user by comparing pre-stored face information with an image of the subject by face recognition technology. Furthermore, in order to enhance the accuracy of face recognition, the controller 180 may further perform a step of verifying whether the subject is a registered user. Hereinafter, various methods for performing the verification step will be described for each embodiment.

In an embodiment, the controller 180 may perform a verification step by using voice information.

Referring to FIG. 8, in a state in which the subject is determined as a registered user, the controller 180 may further perform a step of comparing voice information associated with pre-stored face information and voice information uttered by the subject (S810).

Face information and voice information associated with the face information may be stored in the memory 170 of the electronic device 100 of the present invention.

In order to verify that the subject is a registered user, the controller 180 may compare voice information associated with pre-stored face information with voice information detected by the voice sensor. For example, the controller 180 may determine whether the pre-stored voice information and the voice information detected by the voice sensor match based on three factors: pitch, volume, and tone.

The controller 180 may verify whether the subject is a registered user based on a result of the comparison. For example, when the pre-stored voice information and the voice information detected by the voice sensor match, the controller 180 may determine the subject as a registered user. Accordingly, the controller 180 may enhance an accuracy of face recognition of a subject having a high misrecognition rate of face recognition because, like a family, the family members look similar to each other.

In another embodiment, the controller 180 may perform a verification step using height information of the subject.

Referring to FIG. 9, the controller 180 may compare height information associated with pre-stored face information with height information of the subject (S910).

The controller 180 may calculate height information of the subject by using voice information detected by the voice sensor. For example, the controller 180 may calculate height information of the subject by using distance information between the subject and the electronic device.

The controller 180 may determine whether the height information associated with the pre-stored face information matches the calculated height information, and check whether the subject is a registered user based on a result of the determination (S920). When the height information does not match, the controller 180 determines that the subject is not a registered user, and when the height information matches, determines that the subject is a registered user.

In another embodiment, the controller 180 may perform face recognition by storing a user's face image for each time zone, and using different face images for each time zone during which a face recognition function is executed.

In the memory 170 of the electronic device related to the present invention, face information of a registered user may be stored for each time zone. That is, the memory 170 may capture and store a user's face for each time zone.

When recognizing a face, the controller 180 may extract face information corresponding to a time when the subject image was captured from among pre-stored face information (S1010). The controller 180 may extract face information corresponding to a time when an object was captured from among a plurality of face information of a specific user stored in the memory 170.

Then, the controller 180 may compare the extracted face information with face information of the captured subject (S1020). The controller 180 may verify whether the subject is a registered user based on a result of comparing the extracted face information with the face information of the captured subject (S1030).

Accordingly, the electronic device related to the present invention may enhance the accuracy of face recognition by verifying whether a subject is a registered user using slight differences on a user's face that changes for each time zone.

According to the present invention, when voice information is detected, an image of a subject related to the voice information is captured, and whether the face of the subject is a counterfeit face is determined using the captured image information, and control corresponding to the voice information according to the determination result By executing the command, use by a device that forged or falsified the voice or use by an unauthorized user can be restricted. Therefore, the present invention may enhance security of electronic devices.

In addition, according to the present invention, when voice information is detected, an image of a subject related to the voice information is captured, and the captured image information is compared with pre-stored voice information to determine whether the voice corresponds to a registered user's voice, and a control corresponding the voice information is determined to be performed. In this manner, only a user who is permitted to use the electronic device can control the electronic device, thereby enhancing the security of the electronic device.

Further, according to the present invention, a distance between an electronic device and a subject that utters voice information is calculated based on voice information, and when face information of the subject is recognized using the distance information, a size of an image of the subject is re-sized to perform face recognition, thereby enhancing face recognition speed without lowering a recognition rate of the face recognition.

The present invention can be implemented as computer-readable codes in program-recorded media. The computer-readable media may include all types of recording devices each storing data readable by a computer system. Examples of such computer-readable medium may include hard disk drive (HDD), solid state disk (SSD), silicon disk drive (SDD), ROM, RAM, CD-ROM, magnetic tape, floppy disk, optical data storage element and the like. Also, the computer-readable media may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. An electronic device comprising:
a sensor configured to detect voice information;
a camera configured to capture an image of a subject related to the voice information;
a memory; and
a controller configured to:
control the camera to capture an image of an area around the electronic device;
identify one or more objects included in the captured image that are capable of providing a voice output
store, in the memory, the identified one or more objects that are capable of providing voice output and corresponding location information of the identified one or more objects;
receive the voice information from the sensor;
calculate location information of a subject related to the voice information based on a direction in which the voice information is received;
determine, in a first case, that the subject related to the voice information is a counterfeit face based on the location information of the subject corresponding to the location information of any of the identified one or more objects;
determine, in a second case, whether the subject related to the voice information is the counterfeit face, or is not the counterfeit face, based on a face image included in the captured image of the subject;
not execute a control command corresponding to the voice information, based on the subject being determined to be the counterfeit face according to either of the first case or the second case; and
execute the control command corresponding to the voice information, based on the determine that the subject is not the counterfeit face.

2. The electronic device of claim 1, wherein the controller is further configured to:
calculate distance information of the subject related to the voice information based on the voice information, and
control the camera to capture the image of the subject by using the calculated distance information of the subject.

3. The electronic device of claim 1, wherein the controller is further configured to:

when the subject is not the counterfeit face based on the location information of the subject not corresponding to the location information of any of the identified one or more objects, compare pre-stored face information with the captured image of the subject based on a face recognition algorithm, and
when the image of the subject corresponds to the pre-stored face information as a result of the comparison, determine the subject as a registered user and execute the control command corresponding to the voice information.

4. The electronic device of claim 1, wherein the controller is further configured to:
calculate a distance between the subject and the electronic device based on the voice information,
change a size of the captured image of the subject by using the calculated distance and size information of a pre-stored face, and
compare pre-stored face information with the image that the size thereof is changed.

5. The electronic device of claim 3, wherein the controller is further configured to:
when the captured image of the subject corresponds to the pre-stored face information, determine whether the control command corresponding to the voice information corresponds to a permission associated with the pre-stored face information, and
when the control command corresponds to the permission associated with the pre-stored face information as a result of the determination, execute the control command corresponding to the voice information.

6. The electronic device of claim 3, wherein the controller is further configured to:
when the captured image of the subject corresponds to the pre-stored face information, compare voice information associated with the pre-stored face information with the voice information received from the sensor, and
when the voice information associated with the pre-stored face information corresponds to the voice information received from the sensor, execute the control command corresponding to the voice information received from the sensor.

7. The electronic device of claim 3, wherein the controller is further configured to:
when storing face information of the registered user, store together with height information of the registered user in the memory by linking the height information to the face information.

8. The electronic device of claim 7, wherein the controller is further configured to:
calculate the height information of the subject based on the voice information detected by the sensor,
compare the calculated height information with the height information stored in the memory, and
verify whether the subject is the registered user.

9. The electronic device of claim 3, wherein the controller is further configured to:
when registering face information of the subject, store together with capturing time information of the face information, and
determine whether the subject is the registered user by comparing the captured image of the subject with the face information corresponding to the capturing time of the subject.

10. The electronic device of claim 1, wherein the controller is further configured to:

extract feature information from the captured image of the subject, and perform an update of a pre-stored face image.

11. A method for controlling an electronic device, the method comprising:
- capturing an image of an area around the electronic device through a camera;
- identifying one or more objects included in the captured image that are capable of providing a voice output;
- storing, in a memory, the identified one or more objects that are capable of providing voice output and corresponding location information of the identified one or more objects;
- detecting voice information through a sensor;
- when the voice information is detected by the sensor, capturing an image of a subject related to the voice information through the camera;
- calculating location information of the subject related to the voice information based on a direction in which the voice information is received;
- determining, in a first case, that the subject related to the voice information is a counterfeit face based on the location information of the subject corresponding to the location information of any of the identified one or more objects;
- determining, in a second case, whether the subject related to the voice information is the counterfeit face, or is not the counterfeit face, based on a face image included in the captured image of the subject;
- not executing a control command corresponding to the voice information, based on the subject being determined to be the counterfeit face according to either of the first case or the second case; and
- executing the control command corresponding to the voice information, based on the determining that the subject is not the counterfeit face.

* * * * *